(12) United States Patent
Hays

(10) Patent No.: US 6,413,074 B1
(45) Date of Patent: Jul. 2, 2002

(54) ASSEMBLY FOR MOLDING PLASTIC MATERIAL

(75) Inventor: Steven D. Hays, Newark, OH (US)

(73) Assignee: Composix Corporation, Newark, OH (US)

( * ) Notice: Subject to any disclaimer, the term of this patent is extended or adjusted under 35 U.S.C. 154(b) by 0 days.

(21) Appl. No.: 09/407,317

(22) Filed: Sep. 28, 1999

(51) Int. Cl.⁷ ............................................... B29C 43/04
(52) U.S. Cl. ..................... 425/398; 425/403; 425/451.7
(58) Field of Search ............................. 425/394, 398, 425/403, 451.7

(56) References Cited

U.S. PATENT DOCUMENTS

| | | | |
|---|---|---|---|
| 2,291,580 A | 7/1942 | Poglein | 49/76 |
| 2,292,593 A | 8/1942 | Amigo | 18/30 |
| 3,193,878 A | 7/1965 | Corlett | 18/14 |
| 3,861,640 A | 1/1975 | Agnet | 249/102 |
| 3,871,711 A | 3/1975 | Taket | 244/102 |
| 4,155,642 A | 5/1979 | Kermoian | 425/292 |
| 4,551,084 A | 11/1985 | Lake | 425/185 |
| 4,861,254 A | 8/1989 | Takeuchi et al. | 425/190 |
| 4,889,480 A | * 12/1989 | Nakamura et al. | 425/577 |
| 5,221,248 A | * 6/1993 | Weder et al. | 493/133 |
| 5,573,789 A | * 11/1996 | Weder et al. | 425/394 |
| 6,248,281 B1 | * 6/2001 | Abe et al. | 264/328.7 |

FOREIGN PATENT DOCUMENTS

NL   7209132   1/1973

* cited by examiner

*Primary Examiner*—Nam Nguyen
*Assistant Examiner*—Joseph S. Del Sole
(74) *Attorney, Agent, or Firm*—Charles F. Schroeder

(57) ABSTRACT

A mold assembly for press molding plastic material into products under heat and pressure wherein the material is placed on a base mold having at least one or more guide blocks spaced thereabout for accommodation of wedge mold segments each having a surface matched to a portion of the base mold. Each wedge mold segment is arranged to move over an inclined surface of a guide block into compression mated association with material to be molded on the respective portion of the mold base to which it is matched. In operation the wedges are pushed downward by a press and moved laterally over the stationary inclined surfaces of the guide blocks which guide the wedges inwardly in matched pressure relation with the material to be molded on the sides of the base mold. The invention also includes division of the wedge mold segment into an assembly of two parts in which a mold section is backed by an associated wedge member which pushes the mold section into molding position.

21 Claims, 5 Drawing Sheets

ASSEMBLY FOR MOLDING PLASTIC MATERIAL

BACKGROUND

This invention [deals with molding of] is a mold assembly which, by way of example can mold relatively inextensible thin fiber reinforced plastic sheet material into box or container shaped products in a press in which the plastic sheet material reinforced such as by carbon or glass fibers has little or no stretchability. Usually molding of such boxlike products requires slightly outwardly inclined sidewalls to permit application of vertical pressure to the sidewall layers of material during heat cure. Usual molding of such boxlike products also involves use of metal molds having flared or outwardly inclined walls to permit separation of the product from both male and female mold parts. If the desired thin wall plastic boxlike product is to be made with precise right angular sides, problems arise in molding in that vertical pressure is not applicable to the sides and mold parts are not readily separable from the cured product.

BRIEF DESCRIPTION OF THE INVENTION

According to the present invention, relatively thin high modulus fiber reinforced plastic sheet material can be molded in a press into boxlike products with precisely right angular sides or inwardly angled walls by use of slidably movable, sloping, metal mold wedges. The wedges are pushed downwardly by a press which cause them to slide in a lateral direction over stationary inclined surfaces of metal side guide blocks which guide the wedges at right angles to the pressure toward a male mold.

As indicated above the usual female mold with a male mold and die has flaring dimensional requirements to permit closure of the female mold die and removal of the product from about the male mold. Such flaring does not allow application of adequate pressure on the sides of the male mold. In the method and means herein disclosed, however, the female mold is replaced by one or more of what can be termed "wedge molds." The "wedge molds" are metal segments having one side matched in shape to a portion of the male mold to permit molding of a corresponding portion of product therebetween under heat and pressure. The other side of each wedge mold is inclined and arranged to be moved over a mated inclined surface of a stationary guide inclined downwardly toward the male mold. Each wedge mold is thereby moved transversely or laterally toward the male mold upon application of vertical pressure force against the top of the wedge mold.

A series of such stationary guides and associated wedge molds appropriately shaped and spaced about a male mold base can be pressurized from above by a press platen acting against a top plate mold section to cause plastic material placed on the male mold to be encompassed by wedge molds and cured under heat and pressure. In other words, each wedge mold is shaped on its mold side to match a side portion of the male mold while the other side has an inclined slide surface arranged to cause movement of the wedge mold over a cooperatively matching inclined surface of a stationary guide. The guide is positioned to direct movement of its respective wedge mold toward and in side pressure relation with material on the male mold upon application of vertical pressure on the wedge mold.

An object of the invention is to provide a method and means for molding relatively inextensible plastic sheet material with vertically applied press force which also translates into transverse molding force by way of a novel mold design incorporating wedge molds capable of making a wide range of difficult shapes.

In this regard a number of container shapes can be made using the invention such for example as with inwardly curved walls by using shaping wedges having curved surfaces designed to be pushed into mating curved surfaces of a male mold base. In such arrangements the male mold can also be in segments removable from the boxlike container product after its cured.

A feature of the invention is that both its method and means lend themselves to production of container products not only having straight sides but products having curved sidewalls or products with inwardly directed sidewalls using correspondingly shaped mold wedges which mate with matching surfaces on the male mold.

Other objects and structural features which are believed to be characteristic of the invention are set forth with particularity in the appended claims. The invention, however, both in organization and the manner of construction, together with further objects and features thereof may be best understood by reference to the following description taken in connection with the accompanying drawings.

THE DRAWINGS

DETAILED DESCRIPTION

Figure 1:
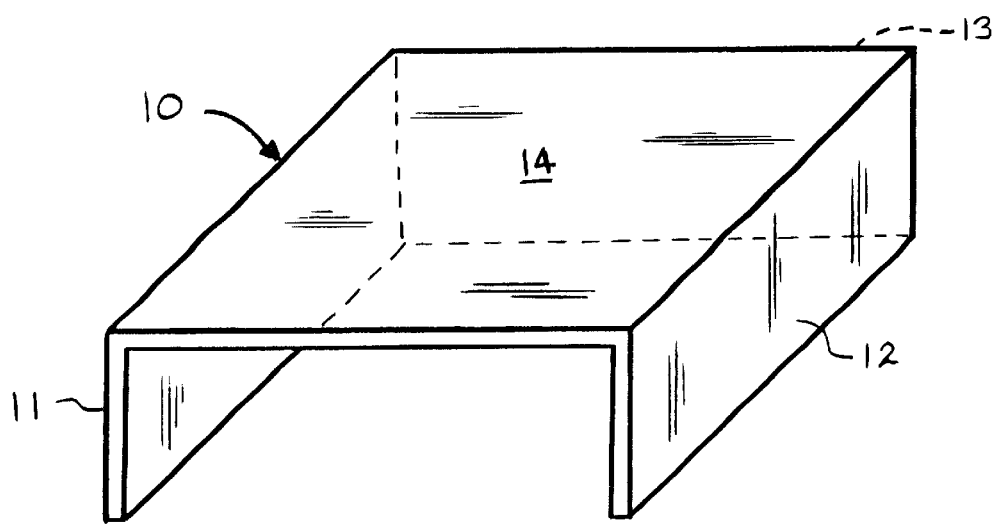
FIG. 1 is an illustration of a container product having straight right angular sides extending from a base surface which according to the present invention can be made of sheet material having very little or no extensibility such as of high tensile strength glass fiber reinforced plastic sheet material.

FIG. 1 is illustrative of one type of container moldable according to the concepts of the present invention in which the container 10 shown in down side up position is open sided and has two opposing sides 11 and 12 and a backside 13 and a top 14 which during molding is at the top but actually is the bottom of the container. The method of producing the container is unique in that only vertical pressure is applied by a press to the mold to produce the container with vertical sides. That is, whereas the press pressure is only in one direction, mold pressures are applied to the material of the container transversely to the direction of such pressure by uniquely designing the mold assembly with wedge mold segments which move laterally responsive to the vertical pressure applied by a press.

Figure 2:
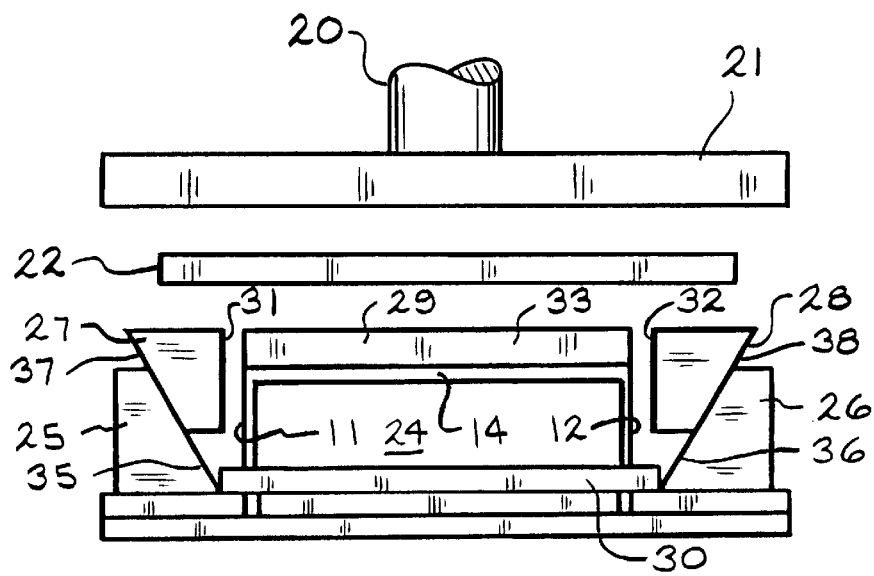
FIG. 2 is a schematic illustration of a mold for making the product of FIG. 1 wherein a male mold section has fiber reinforced plastic material placed thereover and wedge type mold sections placed thereabout for application of lateral pressure thereon which upon application of heat results in cure of the plastic material into the desired product.

The container 10 is molded by a mold assembly mounted in a press such as is partially shown in FIG. 2 in which a press platen 21 driven by a press shaft 20 applies pressure to a plate-like top mold segment 22. The top mold 22 is arranged to apply force to the upper surface of each of three wedge molds, namely the two opposing wedge molds 27 and 28 on opposite sides of a male mold 24 and the backside wedge mold 29. Whereas the platen 21 of the press can be used to apply pressure directly to the assembly, in the assembly of FIG. 2 a separate top plate mold 22 provides some flexibility in design such as were the bottom of the container design calls for different thicknesses across its length and width.

The wedge mold segments are shown in a raised condition to illustrate more clearly how the components fit together and how the mold segments operate in relation to each other. The two wedge molds 27 and 28 operate cooperatively with the stationary guides 25 and 26 respectively, on opposite sides of the male mold 24. Each of the stationary guides has an angular surface over which its respective wedge mold is slid in wedged or relation toward the mold base or male mold 24.

By way of example, the left wedge mold 27, is provided with an inverted angular surface 37 which functions cooperatively with a matching angular surface 35 on the stationary guide 25 to guide the wedge mold toward the male mold 24. In this respect the wedge mold 27 has an opposite mold surface 31 arranged to press against the material to be molded on the male mold base 24 namely the side 11 of the open container side 10. That is the wedge mold 27 is moved downwardly by force applied to the top mold segment 22 by the press platen 21. The wedge mold 27 thereupon slides on its angular surface 37 over the reverse matching angular surface 35 of the guide 25 to press the mold 27 into compression relation with the material forming the side 11 between the wedge mold surface 31 and the side of the male mold base 24 which it matches.

Correspondingly, the wedge mold 28 is pressed down by the mold top 22 to slide over an angular surface 36 of the stationary guide 26 toward the side of the male mold 24 to compress the side material of 12 of the container 10. In this respect the wedge mold 28 has a mold surface 32 which matches the side of the male mold on which the material forming the side 12 of the container is disposed. The side 38 opposite to the mold surface 32 is inclined complementary to the surface 36 so that as pressure is applied to the wedge mold 28 from above, transverse pressure is applied toward the material to be molded on the mold 24 in forming the side 12 of the container 10.

Similarly the backside 13 of the container is molded by the mold surface 33 the wedge mold 29 moved over an inclined stationary guide on the backside of the male mold, not here shown.

Upon application of pressure to the top mold segment 22 and correspondingly to the three wedge molds 27, 28 and 29 in unison, pressure is exerted against the material on the male mold 24. Pressure applied to the male mold 24 in the direction of the open side of the container 10 being formed is met by a bracing bar 30 located on the side of the male mold where the open side of the container 10 is located.

Figure 3:
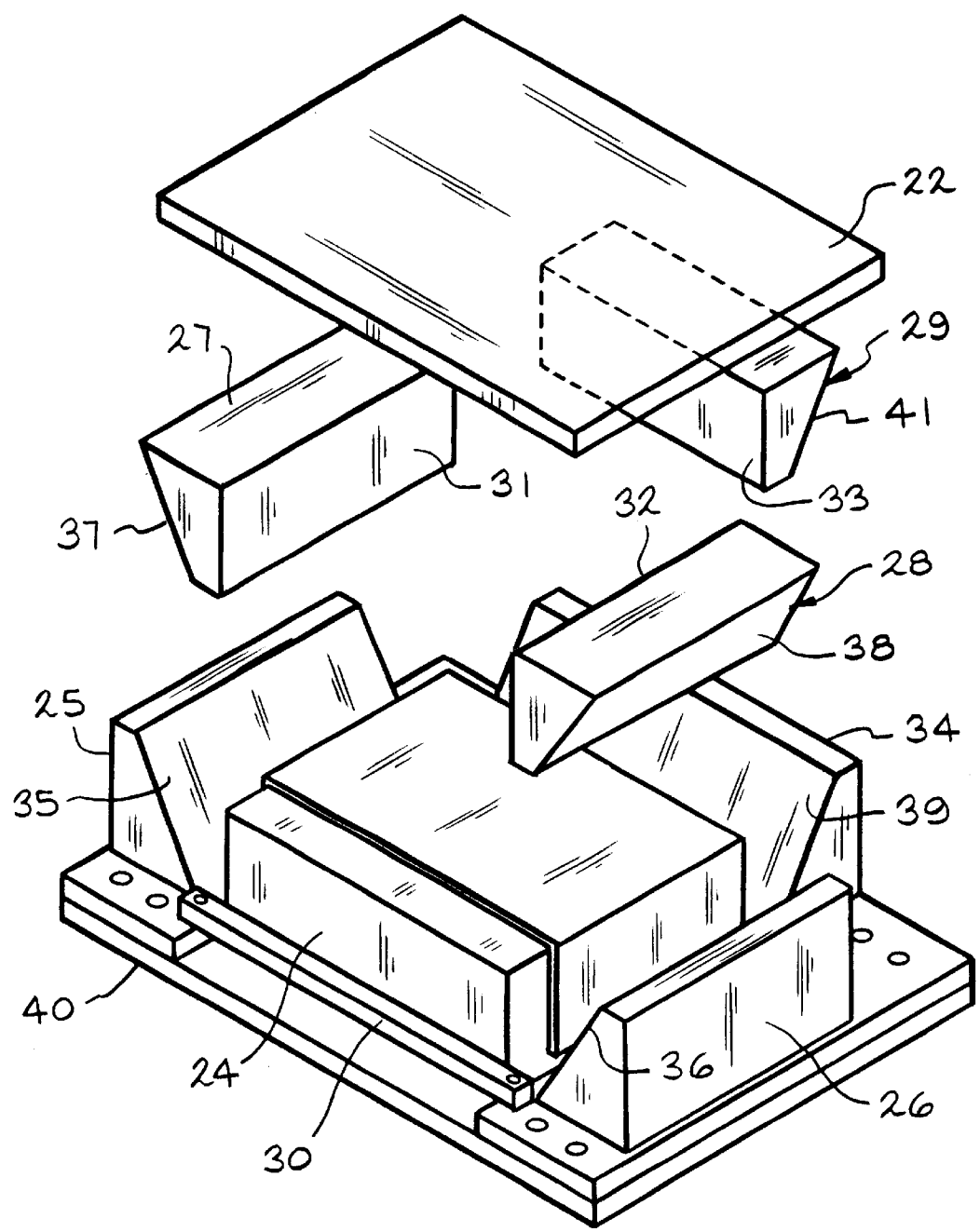
FIG. 3 is an exploded perspective view of the mold assembly of FIG. 2 for making the product of FIG. 1 showing the plastic material for the container lying over the male mold and the three mold wedges spaced above the guides which provide inclined surfaces over which the mold wedges slide.

FIG. 3 which is an exploded view of the components discussed in FIG. 2 illustrates more clearly in perspective the location of the wedge molds 27, 28 and 29 relative to the male mold 24 and their respective side stationary guides 25, 26 and the back stationary guide 34. The wedge mold 27 slides on its surface 37 over the angular guide surface 35 of the stationary guide 25 until the mold surface 31 presses against the material on the male mold 24. Correspondingly, the wedge mold 28 slides on its wedge surface 38 over the angular guide surface 36 of stationary guide 26 until its mold surface 32 presses against the material being molded on the male mold 24. In similar manner the wedge mold 29 slides on its inclined surface 41 over the angular guide surface 39 of the stationary guide 34 until its mold surface 33 presses against the material at the back side of the male mold 24.

Figure 4:
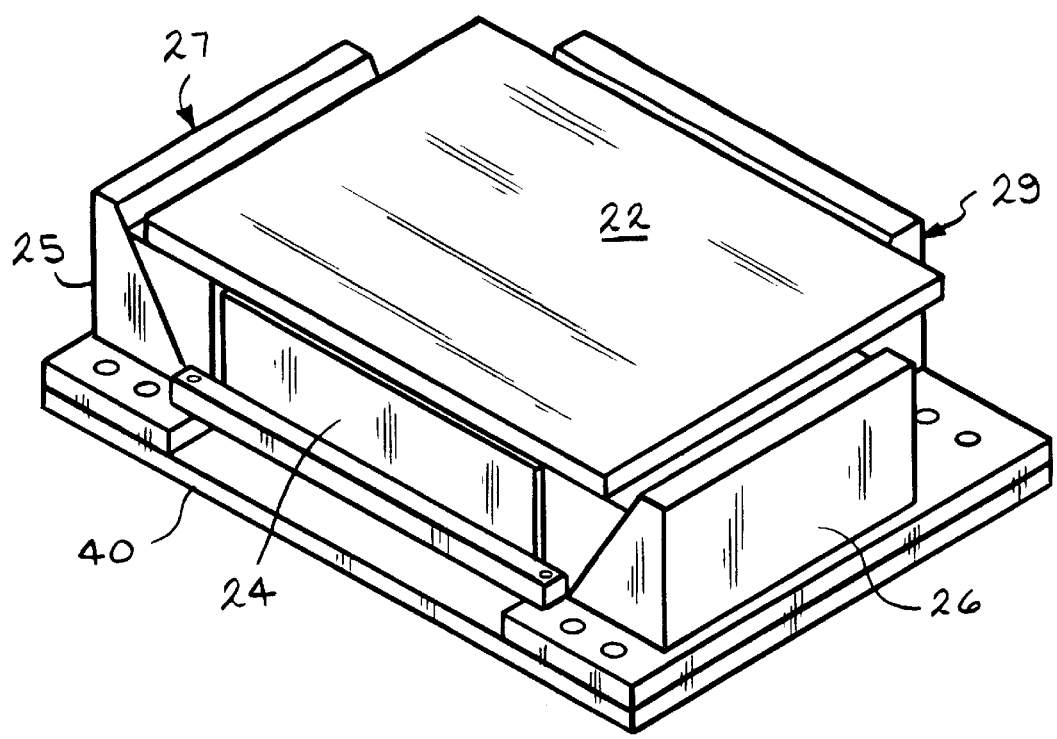
FIG. 4 is a perspective view of the assembled mold components of FIG. 3.

FIG. 4 illustrates how the exploded space components of FIG. 3 appear when the mold is closed with the top 22 pressed downwardly on the wedge molds and into compression with the material on the male mold 24. The material on the mold is compressed and heated at a temperature, for example, at 350 degrees Fahrenheit, to a effect a cure of the product whereupon the top is lifted and the wedge molds removed to permit removal of the container. Since as illustrated the sides 11, 12 and 13 are at right angles to the top 14 of the container it can be lifted from the male mold without mold block. The molded material, by way of example may be high modulus glass fibers or carbon fibers in roving form woven into a fabric saturated with a polyester resin or an epoxy resin which upon cure becomes a rigid product. The material when in its uncured condition can be placed on the male mold in sections preparatory to molding by first placing one or more lengths of the flexible uncured material about the sides of the male mold and covering the top of the male mold with a layer of the material cut to size to match the top. Extra material can be provided at the edges where necessary to effect a merger abutting edges of the material parts upon cure.

Figure 5:
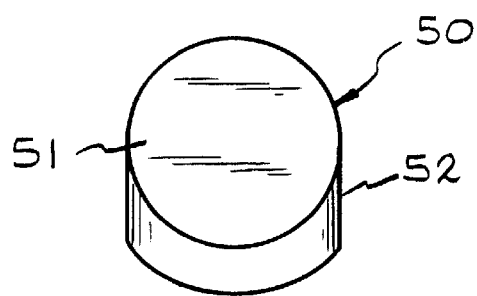
FIG. 5 is a perspective view of a circular container made according to the present invention.

FIG. 5 illustrates another container shape, namely a round container 50 which can be made according to the present invention having a circular top 51 and a wall 52 at right angles thereto.

Figure 6:
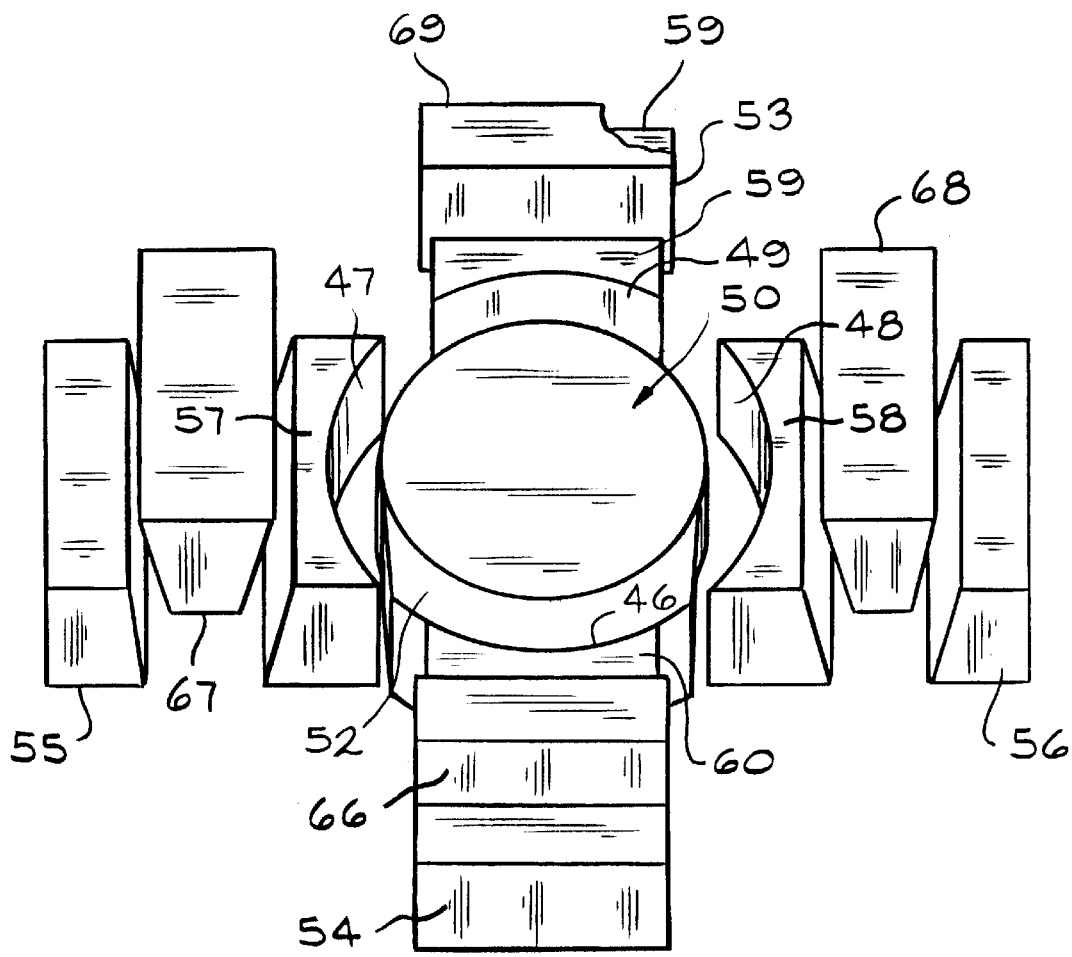
FIG. 6 is somewhat schematic perspective view of mold components for making the circular container in FIG. 5.

FIG. 6 shows the mold component assembly by which the container 50 of FIG. 5 can be made according to the present invention. The container material mounted on the male mold is surrounded by mold segments 57, 58, 59 and 60 having laterally curved mold surfaces 47, 48, 49 and 46 respectively. The mold segments under the force of a press can be arranged to be moved over the inclined guide surfaces of stationary guides 55, 56, 53 and 54 respectively.

Each of the mold segments, however, can be also divided into an assembly of two parts in which a mold section is backed by an associated wedge member. In this arrangement each mold section is shaped to be placed in matched relation adjacent to the material on the male mold and then pushed laterally against the material by its associated wedge member under the downward action of a press. In this regard the mold sections of segments 57, 58, 59, and 60 have wedge slide surfaces inclined oppositely to the inclined surfaces of the stationary guides 55, 56, 53 and 54 respectively. Each of the associated wedge members 67, 68, 69 and 66 with complementary wedging surfaces are arranged to be pressed downward between its respective mold sections and guides by a press which causes their respective mold segments to move laterally into compression communication with the base material being molded on the male mold.

Figure 7:
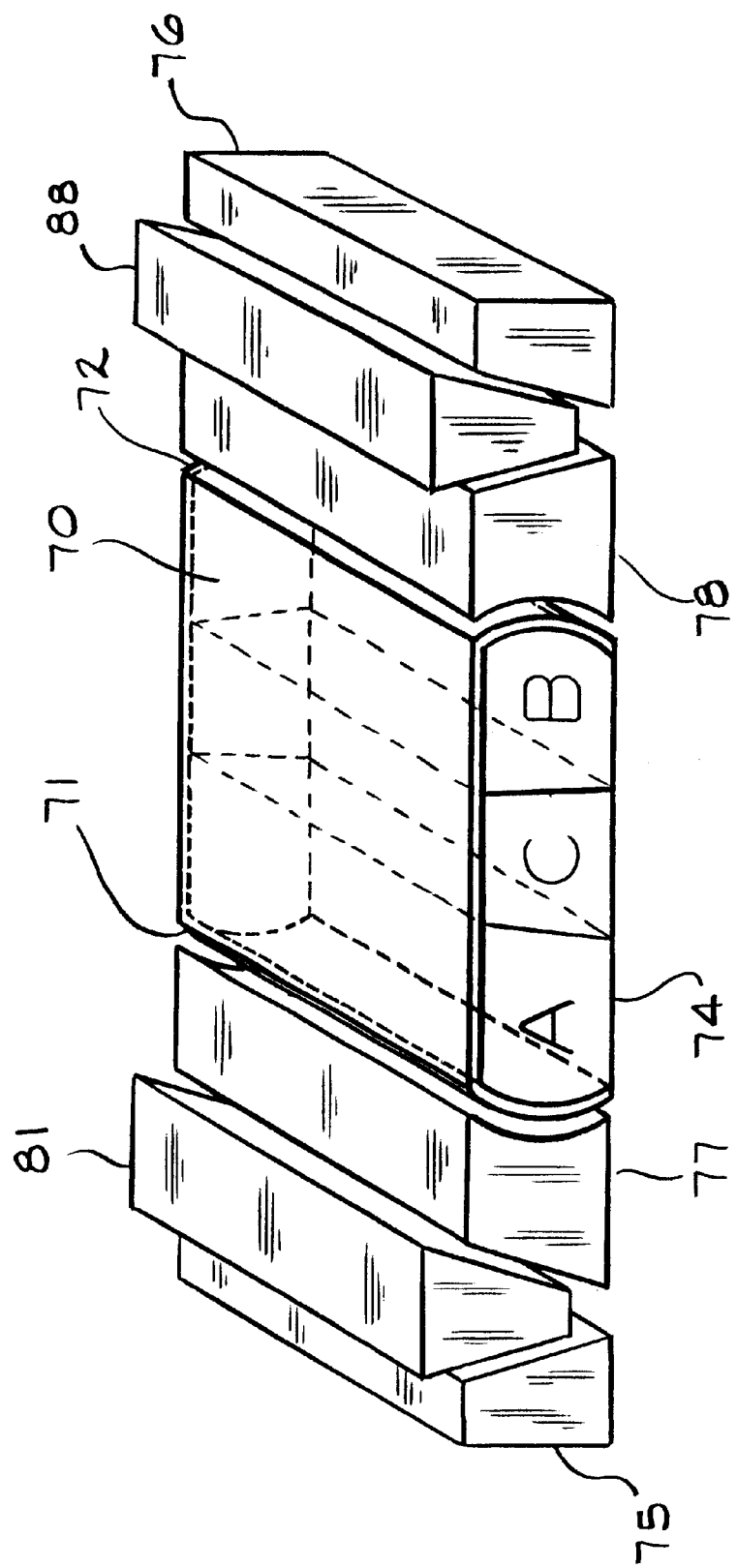
FIG. 7 is a schematic view of mold components for making a container shown with vertically curved sides produced according to the principles of the present invention.

Still another product form which can be produced by the invention is shown schematically in FIG. 7 in which a three dimensional rigid product 70 having generally vertical inward curved walls 71 and 72 can be produced by wedge mold segments 77 and 78, respectively, having correspondingly curved mold surfaces. The wedge mold segments 77 and 78 under pressure of a press can be arranged to slide over the inclined surfaces of the stationary guides 75 and 76 to compress the material which form the curved walls 71 and 72.

As a variation, the mold segments, as in the embodiment of FIG. 6, can be divided into two parts with each mold segment being divided into a mold section and an associated wedge member. More specifically the mold sections 77 and 78 have associated wedge members 81 and 88 which are arranged to be moved over the inclined surfaces of their respectively associated guides 75 and 76 as well as to press against the complementary back angled surfaces of the mold sections. The mold sections 77 and 78 are thus moved into compression molding relation with the material for forming the curved walls 71 and 72 as the wedge members 81 and 88 are pressed downward by a press platen. The press platen not shown also presses against the top of the material on the male mold. The platen may be arranged to heat the mold assembly or the mold assembly can be internally heated such as from the male mold for cure of the material under both heat and pressure. Since the cured product in a sense will lock about the male mold 74, making it difficult or impossible to remove a rigid product, the male mold is divided into segments A, B, and C which can be readily removed one by one to free the cured product. The central segment C can be tapered on two sides with largest dimension on the open side of the product to facilitate its removal from the center of the male mold, whereafter the side segments A and B can also be readily removed from the product.

If the product is one having rigid inwardly curved walls on four sides the male mold can be divided into five segments with a central tapered segment removable like a plug to permit removal of the remaining segments from a rigid product or by dividing the male mold into four segments with the central segment being divided into two parts with an angular parting plane.

In view of the foregoing it will be understood that many variations of the concept of the invention herein disclosed can be effected within the broad scope of the principles embodied therein. Thus while particular embodiments of the invention have been shown and described, it is intended by the appended claims to cover all modification which fall within the true spirit and scope of the invention.

What is claimed is:

1. A mold assembly for molding plastic materials in a press under heat and pressure comprising in combination,
    a male mold for placement of plastic material thereon to be molded,
    at least one wedge mold shaped for cooperative molding association with said male mold,
    a stationary wedge mold guide positioned in spaced adjacent relationship with said male mold,
    said wedge mold being of size and shape to fit between said male mold and said stationary wedge mold guide,
    said wedge mold being shaped on one side for matched molding association with the shape of a portion of said male mold,
    said stationary wedge mold guide having an inclined guide surface for guiding said wedge mold toward said male mold,
    said wedge mold having an inclined surface on one side on which said wedge mold can slide in matched association over said stationary wedge mold guide surface toward a matched relation with said portion of the male mold, and
    said wedge mold being adapted to receipt of pressure of a press to press it into molding pressure relationship with material to be molded on said portion of the male mold.

2. A mold assembly as claimed in claim 1 wherein said stationary wedge mold guide is one of a number of similar guides positioned in spaced relation adjacent to different portions of said male mold and,
    a like number of said wedge molds being provided each in association with a respective one of said stationary wedge mold guides for molding plastic material on said male mold in matched relation to the shape of the portion of said male mold adjacent which said stationary wedge mold guide is positioned.

3. A mold assembly as claimed in claim 2 wherein each of said wedge molds is positioned for direct pressure contact by the platen of a press in which the assembly is positioned.

4. A mold assembly as claimed in claim 2 wherein a top plate mold is provided for pressure molding material on the top of said male mold.

5. A mold assembly as claimed in claim 4 wherein said top plate mold is dimensioned to press all said wedge molds in pressure relation with material to be molded in each of their respective portions of said male mold.

6. A mold assembly for molding of plastic material in a press under heat and pressure comprising in combination,
    a mold base for receipt thereon of material to be molded,
    an associated stationary mold guide spaced in adjacent relationship with said mold base,
    a wedge mold shaped to fit between said mold base and guide,
    said wedge mold and mold guide having cooperative matching inclined surfaces for directing the movement of said wedge mold under pressure over the inclined surface of said guide toward a portion of said mold base, and
    said wedge mold on the side opposite to its said inclined surface being shaped to match in mated relation with said portion of said mold base whereby material on said mold base subjected to pressure and heat is molded between said wedge mold and base mold.

7. A mold assembly as claimed in claim 6 in which a plurality of said wedge molds and said associated stationary mold guides are spaced in adjacent relationship with and about said mold base,
    said mold base, said associated stationary mold guide and said wedge mold being adapted to be mounted in a press for application of pressure by the press to said wedge molds in unison to effect application of wedge mold pressure transverse to the pressure applied by the press for lateral pressurization of material on said mold base.

8. A mold assembly as claimed in claim 7 wherein each of said wedge molds is positioned for direct pressure contact by the platen of a press in which the assembly is mounted.

9. A mold assembly as claimed in claim 7 including a top plate mold overlying the top of said mold base and extending over all said wedge molds whereby upon application of pressure to said top plate mold all said wedge molds are pressurized in unison.

10. A mold assembly as claimed in claim 7 in which said mold base has a top and sides extending downwardly at right angles thereto for molding a container product with sides at right angles to its bottom.

11. A mold assembly as claimed in claim 7 in which said mold base has a top and sides extending downwardly in curved relation thereto.

12. A mold assembly as claimed in claim 11 wherein said mold base is in segments individually separable from a container product made thereon.

13. A mold assembly as claimed in claim 7 in which said mold base in circular for making a circular container product thereon and, said wedge molds have laterally curved molding faces each matched to a portion of the periphery of said circular mold base.

14. A mold assembly as claimed in claim 6 having a plurality of said associated stationary mold guides spaced in adjacent relationship about said mold base, a plurality of said wedge molds each shaped to fit between a respective one of the mold guides and said mold base, said plurality of wedge molds being arranged to be pressed downward over respective mold guides into mated relation with material in the respective portions of said mold base with which each is associated.

15. A mold assembly for molding plastic material in a press under heat and pressure comprising in combination a male mold for receipt of material to be molded thereon under heat and pressure, a plurality of wedge mold segments distributed about said male mold each matched to a respective portion of said male mold for molding material on each said portion of said male mold, a plurality of stationary wedge mold guides each associated with a respective one of said wedge mold segments to guide said respective one of said wedge mold segments into matched molding relation with material on said respective portion of said male mold, said stationary wedge mold guides each having an inclined surface for guiding one of each of said mold segments having a mating inclined surface placed thereon into communication with material on said male mold, said wedge mold segments being arranged for receipt in unison of pressure of a press for application of molding pressure to the portions of material communicated with on said male mold.

16. A mold assembly as claimed in claim 15 wherein said male mold is shaped to form a product having at least one surface extending in the direction of application of pressure by the press in which it is mounted.

17. A mold assembly for molding plastic materials in a press under heat and pressure comprising in combination, a male mold for placement of plastic material thereon to be molded, at least one wedge mold assembly shaped for cooperative molding association with said male mold, a stationary wedge mold guide positioned in spaced adjacent relationship with said male mold, said wedge mold assembly being of size and shape to fit between said male mold and said stationary wedge mold guide, said wedge mold assembly including a wedge mold section shaped on one side for matched molding association with the shape of a portion of said male mold, said stationary wedge mold guide having a guide surface inclined toward said male mold, said wedge mold assembly including a wedge member for placement between said wedge mold section and said stationary wedge mold guide, said wedge member having opposing surfaces angled in matched association with said guide surface and a side of said wedge mold section opposite said one side such that upon pushing said wedge member between said guide surface and said opposite side of said wedge mold section said wedge mold section is pushed into a matched relation with said portion of the male mold, and said wedge member being adapted to receipt of pressure of a press to press said mold section into molding pressure relationship with material to be molded on said portion of the male mold.

18. A mold assembly as claimed in claim 17 including a plurality of said stationary wedge mold guides positioned in spaced relation adjacent to different portions of said male mold and, a plurality of wedge mold assemblies identical in number to the number of said stationary wedge mold guides are provided each in association with a respective one of said stationary wedge mold guides for molding plastic material on said male mold in matched relation to the shape of the portion of said male mold adjacent which its respective guide is positioned.

19. A mold assembly as claimed in claim 18 wherein each of said wedge members are positioned for direct pressure contact by the platen of a press in which said wedge mold assembly is positioned.

20. A mold assembly as claimed in claim 18 wherein a top plate mold is provided for pressure molding material on the top of said male mold.

21. A mold assembly as claimed in claim 20 wherein said top plate mold is dimensioned to press all said wedge members of said wedge mold assemblies under pressure to press their respective said wedge mold sections into molding pressure relation with material to be molded in each of their respective portions of said male mold.

* * * * *